(12) United States Patent
Seo et al.

(10) Patent No.: US 8,681,723 B2
(45) Date of Patent: Mar. 25, 2014

(54) METHOD AND APPARATUS OF TRANSMITTING BACKHAUL SIGNAL IN WIRELESS COMMUNICATION SYSTEM INCLUDING RELAY STATION

(75) Inventors: Han Byul Seo, Anyang-si (KR); Byoung Hoon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 301 days.

(21) Appl. No.: 13/132,746

(22) PCT Filed: Jan. 15, 2010

(86) PCT No.: PCT/KR2010/000242
§ 371 (c)(1),
(2), (4) Date: Jun. 3, 2011

(87) PCT Pub. No.: WO2010/085062
PCT Pub. Date: Jul. 29, 2010

(65) Prior Publication Data
US 2011/0235571 A1    Sep. 29, 2011

Related U.S. Application Data

(60) Provisional application No. 61/146,309, filed on Jan. 22, 2009.

(30) Foreign Application Priority Data

May 13, 2009  (KR) .......................... 10-2009-0041531

(51) Int. Cl.
*H04W 4/00* (2009.01)

(52) U.S. Cl.
USPC ............................................ 370/329; 370/336

(58) Field of Classification Search
USPC ......................................... 370/315, 329, 336
See application file for complete search history.

(56) References Cited

U.S. PATENT DOCUMENTS

| | | | |
|---|---|---|---|
| 6,925,068 | B1 | 8/2005 | Stanwood et al. |
| 2008/0165719 | A1 | 7/2008 | Visotsky |
| 2008/0220788 | A1 | 9/2008 | Stanwood et al. |
| 2009/0150753 | A1* | 6/2009 | Nebat et al. .................. 714/784 |
| 2010/0080139 | A1* | 4/2010 | Palanki et al. ............... 370/252 |
| 2011/0222428 | A1* | 9/2011 | Charbit et al. ............... 370/252 |

* cited by examiner

*Primary Examiner* — Sai-Ming Chan
(74) *Attorney, Agent, or Firm* — Birch, Stewart, Kolasch & Birch, LLP

(57) ABSTRACT

A method and apparatus of transmitting backhaul signals performed by a relay station in a wireless communication system is provided. A relay station performs scheduling with a base station in order to transmit the backhaul signals, and transmitting the backhaul signals to the base station using both resources for downlink transmission and resources for uplink transmission based on the scheduling.

15 Claims, 8 Drawing Sheets

METHOD AND APPARATUS OF TRANSMITTING BACKHAUL SIGNAL IN WIRELESS COMMUNICATION SYSTEM INCLUDING RELAY STATION

This application is the National Phase of PCT/KR2010/000242 filed on Jan. 15, 2010, which claims priority under 35 U.S.C. 119(e) to U.S. Provisional Application No. 61/146,309 filed on Jan. 22, 2009 and under 35 U.S.C. 119(a) to Patent Application No. 10-2009-0041531 filed in the Republic of Korea on May 13, 2009, all of which are hereby expressly incorporated by reference into the present application.

TECHNICAL FIELD

The present invention relates to wireless communication, and more particularly, to a method and apparatus of transmitting backhaul signals between a base station and a relay station.

BACKGROUND ART

Wireless communication systems are being widely deployed in order to provide various kinds of communication services, such as voice or data. In general, the wireless communication system is a multiple access system which can support communication with multiple users by sharing available radio resources. The radio resources can include, for example, time, frequency, codes, and transmission power. The multiple access systems can include, for example, a Time Division Multiple Access (TDMA) system, a Code Division Multiple Access (CDMA) system, a Frequency Division Multiple Access (FDMA) system, an Orthogonal Frequency Division Multiple Access (OFDMA) system, and a Single Carrier Frequency Division Multiple Access (SC-FDMA) system. Time corresponds to the radio resources in the TDMA system, frequency corresponds to the radio resources in the FDMA system, codes correspond to the radio resources in the CDMA system, and subcarriers and time correspond to the radio resources in the OFDMA system. Furthermore, the wireless communication system is a system supporting bi-directional communication. Such bi-directional communication can be performed using a Time Division Duplex (TDD) mode, a Frequency Division Duplex (FDD) mode, a Half-Frequency Division Duplex (H-FDD) mode or the like. In the TDD mode, uplink transmission and downlink transmission are considered as time resources. In the FDD mode, uplink transmission and downlink transmission are considered as frequency resources. In the HFDD mode, uplink transmission and downlink transmission are considered as a combination of time resources and frequency resources.

The wireless communication system includes a Base Station (hereinafter referred to as a 'BS') providing service to a cell (i.e., a specific area). In general, a Mobile Station (hereinafter referred to as an 'MS') can communicate with the BS when it is placed within the coverage of the BS. In the case in which the MS is placed at the boundary of the cell or obstacles, such as buildings, exist between the MS and the BS, the quality of communication between the MS and the BS may not be good.

Several methods are being presented in order to extend the coverage of a BS. One of the methods is to introduce a Relay Station (hereinafter referred to as an 'RS') to a wireless communication system. The RS can extend the coverage of the BS and improve the rate of cell processing.

Uplink and downlink between a BS and an RS is a backhaul link, and uplink and downlink between a BS and an MS or between an RS and an MS is an access link. Hereinafter, a signal transmitted through the backhaul link is called as a backhaul signal, and a signal transmitted through the access link is called an access signal.

If a large amount of radio resources is assigned in order to transmit backhaul signals between the BS and the RS, the amount of radio resources necessary to transmit access signals between the RS and the MS is insufficient, and the efficiency of radio resources used is lowered.

DISCLOSURE OF INVENTION

Technical Problem

The present invention provides a method and apparatus of transmitting backhaul signals between a BS and an RS.

Solution to Problem

In an aspect, a method of transmitting backhaul signals performed by a relay station in a wireless communication system is provided. The method include performing scheduling with a base station in order to transmit the backhaul signals, and transmitting the backhaul signals to the base station using both resources for downlink transmission and resources for uplink transmission based on the scheduling. The resources for downlink transmission may comprise a first frequency band, and the resources for uplink transmission may comprise a second frequency band. The backhaul signals may be simultaneously transmitted in the first frequency band and the second frequency band. The backhaul signals respectively transmitted in the first frequency band and the second frequency band may be one codeword experienced a single channel coding process. Performing the scheduling with the base station may comprise exchanging a configuration signal which comprise information about resources assigned to transmit the backhaul signals with the base station. The information about the resources assigned to transmit the backhaul signals may be semi-persistently indicated using a bitmap. Some of the information about the resources assigned to transmit the backhaul signals may be semi-persistently indicated, and a remainder of the information about the resources assigned to transmit the backhaul signals may be dynamically indicated. The information about the dynamically indicated resources may be transmitted using the semi-persistently indicated resources. The resources for downlink transmission may comprise a first time domain, and the resources for uplink transmission may comprise a second time domain.

In another aspect, a method of transmitting backhaul signals performed by a base station in a wireless communication system is provided. The method include performing scheduling in order to transmit the backhaul signals, and transmitting the backhaul signals to at least one relay station using both resources for downlink transmission and resources for uplink transmission based on the scheduling. The resources for downlink transmission may comprise a first frequency band, the resources for uplink transmission may comprise a second frequency band, and the backhaul signals may be simultaneously transmitted in the first frequency band and the second frequency band. Performing the scheduling may comprise exchanging a configuration signal which comprise information about resources assigned to transmit the backhaul signals with the relay station. The base station may transmit a first backhaul signal to a first relay station in the first frequency band and transmit a second backhaul signal to a second relay station in the second frequency band. The method may further comprise receiving a request to limit resources from the at least one relay station based on communication conditions, wherein the request is used to limit frequency bands or subframes assigned in order to transmit the backhaul signals.

In another aspect, a relay station in a wireless communication system is provided. The relay station include a Radio Frequency (RF) unit configured to transmit and receive a radio signal, and a processor coupled to the RF unit and configured to perform scheduling with a base station in order to transmit backhaul signals and to transmit the backhaul signals to the base station using both resources for downlink transmission and resources for uplink transmission based on the scheduling.

In another aspect, a base station in a wireless communication system is provided. The base station include a Radio Frequency (RF) unit configured to transmit and receive a radio signal, and a processor coupled to the RF unit and configured to perform scheduling in order to transmit backhaul signals and to transmit the backhaul signals to at least one relay station using both resources for downlink transmission and resources for uplink transmission based on the scheduling.

Advantageous Effects of Invention

According to the present invention, backhaul signals can be transmitted between a BS and an RS through the efficient use of radio resources.

MODE FOR THE INVENTION

Wideband Code Division Multiple Access (WCDMA) can be implemented using radio technologies, such as Universal Terrestrial Radio Access Network (UTRAN) according to the 3GPP standards. CDMA2000 is CDMA-based radio technology. High Rate Packet Data (HRPD) in accordance with 3GPP2 standards provides high packet data services in CDMA2000-based systems. evolved HRPD (eHRPD) is the evolution of HRPD. Time Division Multiple Access (TDMA) can be implemented using radio technologies, such as Global System for Mobile communications (GSM), General Packet Radio Service (GPRS), and Enhanced Data rates for GSM Evolution (EDGE). Orthogonal Frequency Division Multiple Access (OFDMA) can be implemented using radio technologies, such as IEEE 802.11 (Wi-Fi), IEEE 802.16 (WiMAX), IEEE 802-20, and Evolved-UTRAN (E-UTRAN). Long Term Evolution (LTE) is part of Evolved-UMTS (E-UMTS) using E-UTRAN. LTE adopts OFDMA in the downlink and adopts Single Carrier FDMA (SC-FDMA) in the uplink. LTE-Advanced (LTE-A) is the evolution of LTE.

Although 3GPP LTE and LTE-A are chiefly described in order to clarify a description, the technical spirit of the present invention is not limited to the 3GPP LTE/LTE-A.

Figure 1:
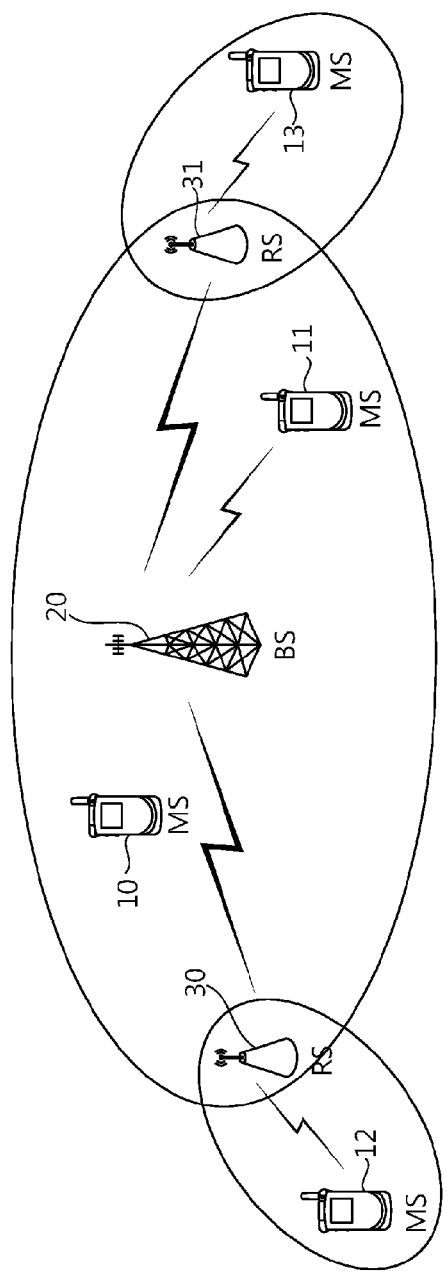
FIG. 1 is a diagram showing a wireless communication system in which RSs have been introduced.

FIG. 1 is a diagram showing a wireless communication system in which RSs have been introduced. The wireless communication system is widely deployed in order to provide various communication services, such as voice and packet data.

Referring to FIG. 1, the wireless communication system includes MSs 10, 11, 12, and 13, a BS 20, and RSs 30 and 31. The MSs 10, 11, 12, and 13 can be fixed or mobile and called another terminology, such as a User Equipment (UE), a User Terminal (UT), a Subscriber Station (SS), or a wireless device. In general, the BS 20 refers to a fixed station communicating with the MSs 10, 11, 12, and 13, and it can be called another terminology, such as Node-B, a Base Transceiver System (BTS), or an access point. One or more cells exist in one BS 20. The RSs 30 and 31 are used to extend the coverage or to enhance the transmission rate according to the diversity effect and are placed between the MS and the BS. That is, the MSs 10 and 11 within the coverage of the BS 20 can directly communicate with the BS 20, and the MSs 12 and 13 outside of the coverage of the BS 20 communicate with the BS 20 via the respective RSs 30 and 31. Alternatively, although the MSs 10 and 11 exist within the coverage of the BS 20, they can communicate with the BS 20 via the RSs 30 and 31 in order to enhance the transmission rate according to the diversity effect. A Macro User Equipment (hereinafter referred to as an 'MaUE') is an MS directly communicating with a BS, and a Relayed User Equipment (hereinafter referred to as an 'ReUE') is an MS communicating with an RS. Hereinafter, unless specially stated, an MS generally refers to an MaUE or an ReUE.

Downlink (DL) refers to communication from the BS 20 to the MS 10, from the BS 20 to the RS 30, and from the RS 30 to the MS 10. Uplink (UL) refers to communication from the MS 10 to the BS 20, from the MS 10 to the RS 30, and from the RS 30 to the BS 20. In the downlink, a transmitter can be a part of a BS, and a receiver can be a part of an MS. In the uplink, a transmitter can be a part of an MS, and a receiver can be a part of a BS.

Figure 2:
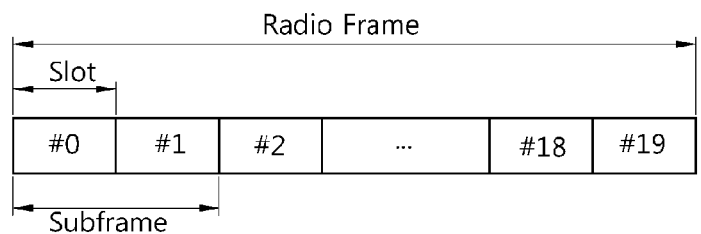
FIG. 2 shows a FDD radio frame structure of a 3GPP LTE system.

FIG. 2 shows a FDD radio frame structure of a 3GPP LTE system. For further information, reference can be made to Section 4.1 of 3GPP TS 36.211 "Technical Specification; Evolved Universal Terrestrial Radio Access (E-UTRA); Physical Channels and Modulation (Release 8)".

Referring to FIG. 2, a radio frame includes ten subframes. One subframe includes two slots. For example, the length of one subframe can be 1 ms, and the length of one slot can be 0.5 ms. The slot can include seven OFDMA symbols in a normal Cyclic Prefix (hereinafter referred to as a 'CP') and can include six OFDMA symbols in an extended CP. The radio frame structure shown in FIG. 2 is only illustrative, and the number of subframes included in the radio frame or the number of slots included in the subframe can be changed in various ways. In FDD, downlink transmission and uplink transmission are separated from each other in the frequency domain.

Figure 3:
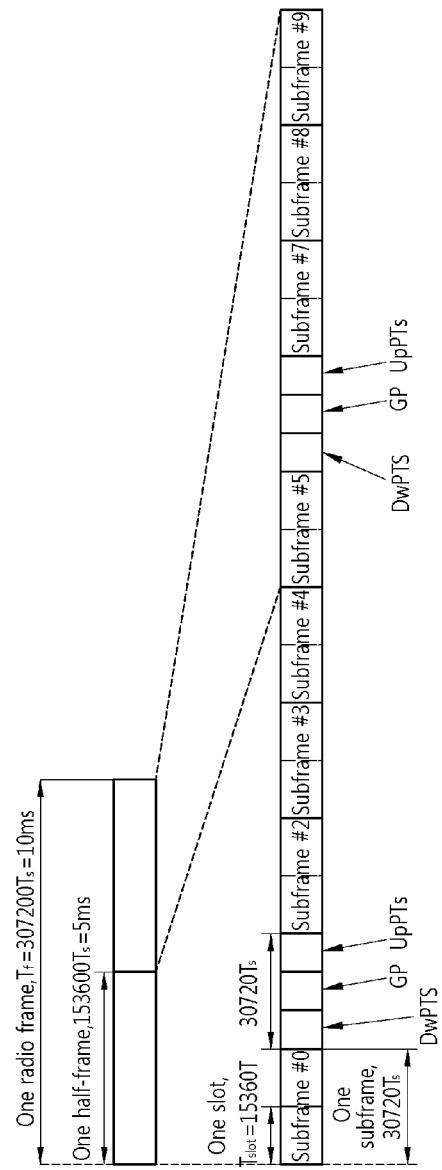
FIG. 3 shows a TDD radio frame structure of the 3GPP LTE system.

FIG. 3 shows a TDD radio frame structure of the 3GPP LTE system. For further information, reference can be made to Section 4.2 of 3GPP TS 36.211 "Technical Specification; Evolved Universal Terrestrial Radio Access (E-UTRA); Physical Channels and Modulation (Release 8)".

Referring to FIG. 3, one radio frame includes two half-frames. Each of the half-frames includes five subframes.

Uplink and downlink are classified in the unit of a subframe, and an uplink subframe and a downlink subframe are separated from each other by a switching point. The switching point is a region for separating uplink and downlink from each other between the uplink subframe and the downlink subframe. A radio frame includes at least one switching point. The switching point includes a Downlink Pilot Time Slot (hereinafter referred to as a 'DwPTS'), a Guard Period (GP), and an Uplink Pilot Time Slot (hereinafter referred to as a 'UpPTS'). The DwPTS is used for initial cell search, synchronization, or channel estimation. The UpPTS is used for channel estimation in a BS and uplink transmission synchronization for an MS. The GP is used to remove interference which occurs in the uplink because of the multi-path delay of a downlink signal between the uplink and the downlink.

Table 1 shows the structure of a radio frame which can be configured depending on the deployment of an uplink subframe and a downlink subframe in the LTE TDD system.

TABLE 1

| UL-DL configuration | DL-to-UL switch-point periodicity | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D refers to a downlink subframe, U refers to an uplink subframe, and S refers to a special subframe. The special subframe indicates a switching point (i.e., DwPTS+GP+UpPTS). The configurations 0 to 2 and 6 correspond to configurations in which the downlink and the uplink are changed in the switching point cycle of 5 ms, and the configurations 3 to 5 correspond to configurations in which the downlink and the uplink are changed in the switching point cycle of 10 ms.

Table 2 illustrates a method of configuring a DwPTS, a GP, and an UpPTS which are taken into consideration in the LTE system. In this table, Ts refers to a sampling time and it is calculated as $1/(15000*2048)$ (sec).

TABLE 2

| | Normal CP in DL | | | Extended CP in DL | | |
|---|---|---|---|---|---|---|
| Special | | UpPTS | | | UpPTS | |
| subframe configuration | DwPTS | Normal CP in UL | Extended CP in UL | DwPTS | Normal CP in UL | Extended CP in UL |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The special subframe can have nine combinations in a normal CP and seven combinations in an extended CP.

FIGS. 4 to 7 show examples in which signals are transmitted among a BS, an RS, and MSs which are operated in the FDD mode.

A first frequency band f1 is a frequency band for downlink transmission, and a second frequency band f2 is a frequency band for uplink transmission. Accordingly, the BS transmits a signal to the MaUE through the first frequency band, and the MaUE transmits a signal to the BS through the second frequency band. The RS transmits a signal to an ReUE through the first frequency band, and the ReUE transmits a signal to the RS through the second frequency band.

Figure 4:
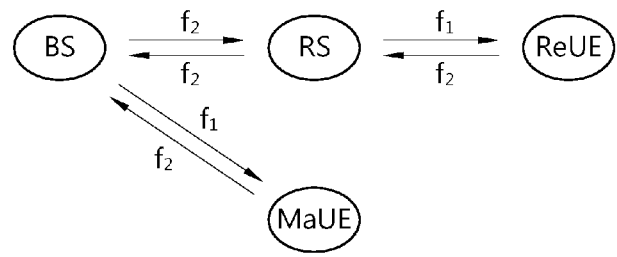
FIGS. 4 to 7 show examples in which signals are transmitted among a BS, an RS, and MSs which are operated in the FDD mode.

Referring to FIG. 4, the BS transmits a backhaul signal to the RS through the second frequency band, and the RS transmits a backhaul signal to the BS through the second frequency band.

Figure 5:
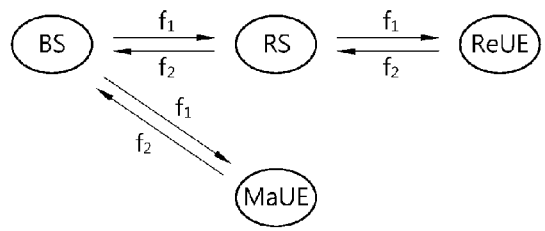

Referring to FIG. 5, the BS transmits a backhaul signal to the RS through the first frequency band, and the RS transmits a backhaul signal to the BS through the second frequency band.

Figure 6:
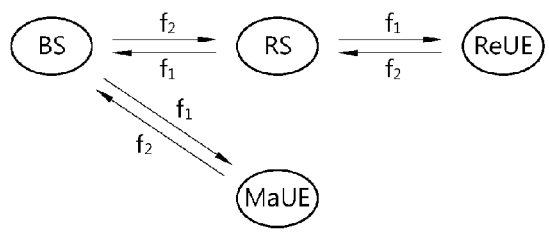

Referring to FIG. 6, the BS transmits a backhaul signal to the RS through the second frequency band, and the RS transmits a backhaul signal to the BS through the first frequency band.

Figure 7:
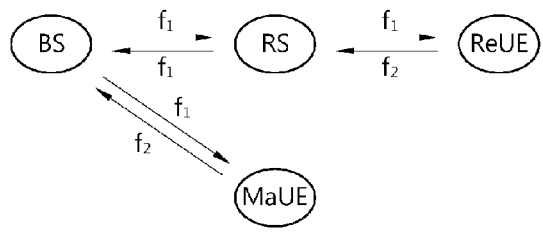

Referring to FIG. 7, the BS transmits a backhaul signal to the RS through the first frequency band, and the RS transmits a backhaul signal to the BS through the first frequency band.

Referring to FIGS. 4 to 7, the BS or the RS transmits the backhaul signal through only any one of the first frequency band and the second frequency band. In the case in which a backhaul signal is transmitted through only a specific frequency band as described above, if the amount of backhaul signals is large, a problem arises because the amount of radio resources, which can be assigned for the transmission of signals between a BS and an MS or between an RS and an MS, is insufficient. Such a problem is more severe, in particular, when a plurality of RSs is coupled to one BS. Accordingly, there is a need for a method of transmitting backhaul signals, which is capable of efficiently using radio resources.

Accordingly, there is proposed a method of transmitting backhaul signals using both resources for uplink transmission and resources for downlink transmission.

First, a FDD system is taken into consideration. In FDD, downlink transmission and uplink transmission are separated from each other in the frequency dimension. Hereinafter, a frequency band for downlink transmission is referred to as a DL frequency band, and a frequency band for uplink transmission is referred to as an UL frequency band. The DL frequency band may be called a first frequency band f1, and the UL frequency band may be called a second frequency band f2.

Figure 8:
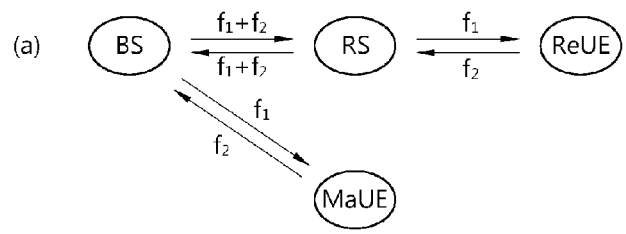
FIG. 8 illustrates an example in which signals are transmitted among a BS, an RS, and MSs which are operated in the FDD mode according to an embodiment of the present invention.
Figure 8:
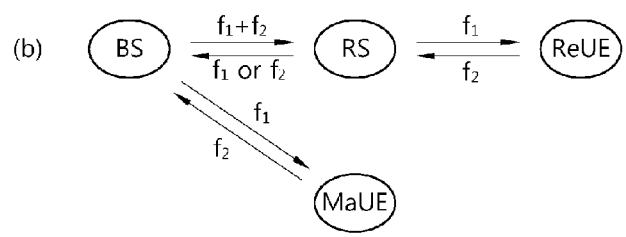

FIG. 8 illustrates an example in which signals are transmitted among a BS, an RS, and MSs which are operated in the FDD mode according to an embodiment of the present invention. The BS transmits a signal to an MaUE through the first frequency band, and the MaUE transmits a signal to the BS through the second frequency band. The RS transmits a signal to an ReUE through the first frequency band, and the ReUE transmits a signal to the RS through the second frequency band.

Referring to (a) of FIG. 8, the BS can transmit a backhaul signal to the RS using both the first frequency band and the second frequency band, and the RS can transmit a backhaul signal to the BS using both the first frequency band and the second frequency band. That is, each of the BS and the RS can transmit the backhaul signal using both the first frequency band and the second frequency band. Referring to (b) of FIG. 8, the BS can transmit a backhaul signal to the RS using both the first frequency band and the second frequency band, and the RS can transmit a backhaul signal to the BS using the first frequency band or the second frequency band. Alternatively, the BS may transmit the backhaul signal to the RS using the first frequency band or the second frequency band, and the RS may transmit the backhaul signal to the BS using both the first frequency band and the second frequency band.

In the case in which the BS or the RS transmits backhaul signals using both the first frequency band and the second frequency band, the BS or the RS can transmit some of the backhaul signals using the first frequency band and the remainder of the backhaul signals using the second frequency band. If the BS or the RS transmits different backhaul signals using the first frequency band and the second frequency band, the transmission rate can be enhanced. Alternatively, the BS or the RS may transmit the same backhaul signal using the first frequency band and the second frequency band. If the same backhaul signal is transmitted using the first frequency band and the second frequency band, the diversity gain can be obtained.

Figure 9:
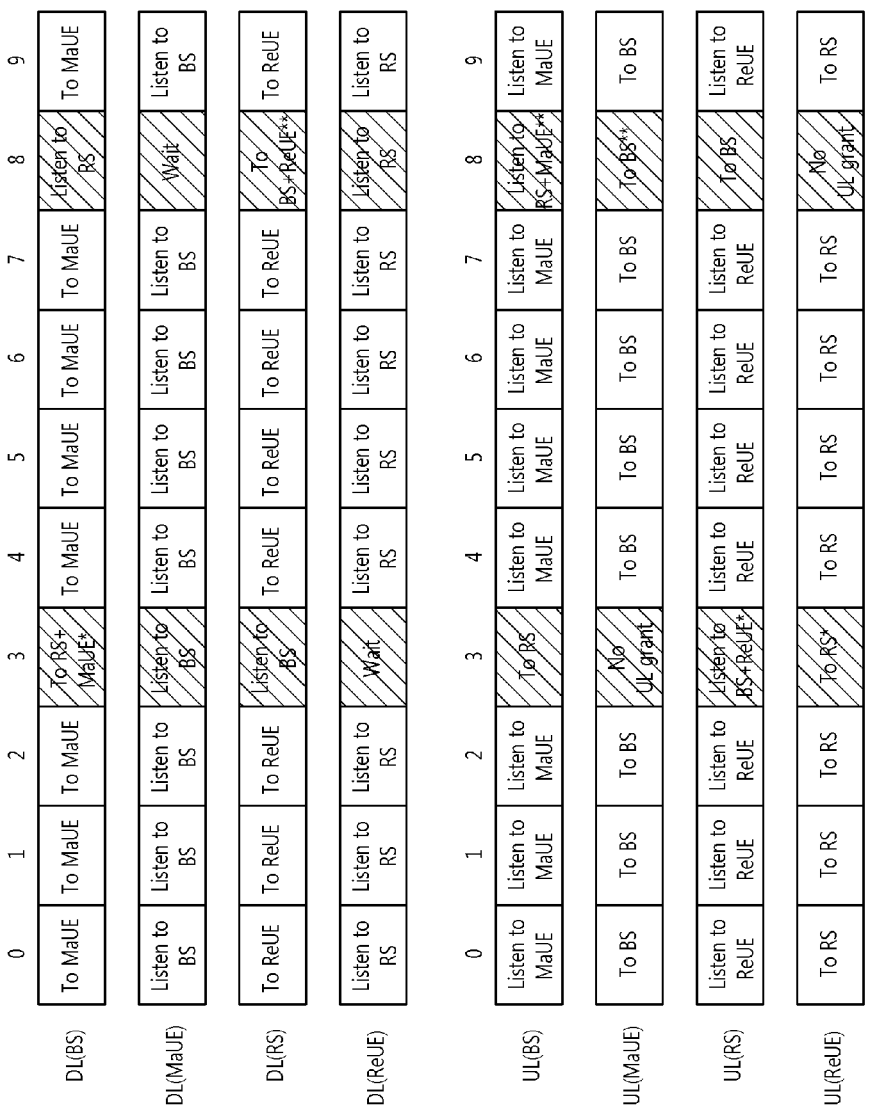
FIGS. 9 and 10 show examples in which backhaul signals are transmitted using both a DL frequency band and an UL frequency band in the FDD mode according to an embodiment of the present invention.
Figures 10, 11:
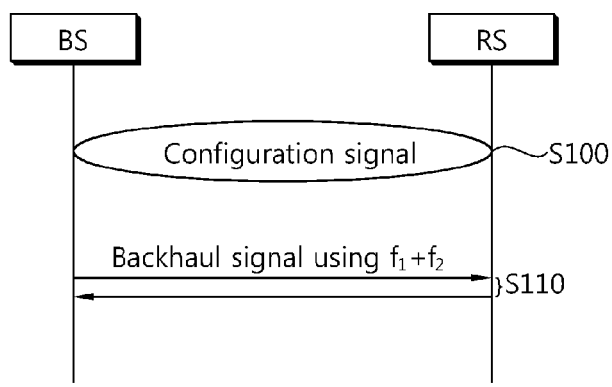
FIG. 11 is a flowchart illustrating a method of transmitting backhaul signals according to an embodiment of the present invention.

FIGS. 9 and 10 show examples in which backhaul signals are transmitted using both the DL frequency band and the UL frequency band in the FDD mode according to an embodiment of the present invention.

Referring to FIGS. 9 and 10, a BS transmits an access signal to an MaUE in each subframe using a DL frequency band, and an RS transmits an access signal to an ReUE in each subframe using the DL frequency band. Accordingly, the MS can consistently monitor a reference signal, a control channel, and a synchronization signal. The MaUE transmits an access signal to the BS in each subframe using an UL frequency band, and the ReUE transmits an access signal to the RS in each subframe using the UL frequency band. Here, "*" or "**" means that orthogonality must be guaranteed between two different signals which are transmitted and received at the same time.

The BS can transmit backhaul signals to the RS using both the DL frequency band and the UL frequency band. The RS can transmit backhaul signals to the BS using both the DL frequency band and the UL frequency band. Each of the BS and the RS can transmit different codewords through the DL frequency band and the UL frequency band or can transmit the same codeword through the DL frequency band and the UL frequency band. If different codewords which have experienced additional channel coding processes are transmitted through the respective frequency bands, the transmission rate can be enhanced because a large amount of backhaul signals can be transmitted. If one codeword that has experienced one channel coding process is transmitted through each of the DL and UL frequency bands, the convenience of an Acknowledgement/Non-Acknowledgement (ACK/NACK) process or the frequency diversity gain effect can be maximized.

In FIG. 9, the BS transmits the backhaul signals to the RS in the subframe 3 of the DL frequency band and in the subframe 3 of the UL frequency band. The RS transmits the backhaul signals to the BS in the subframe 8 of the DL frequency band and in the subframe 8 of the UL frequency band.

When the BS transmits the backhaul signals to the RS in the subframe 3 using the DL frequency band, the RS cannot transmit the access signal to the ReUE using the DL frequency band. Accordingly, the RS can configure the DL frequency band for the ReUE in the subframe 3 in Multicast Broadcast Single Frequency Network (MBSFN) subframes. The BS may transmit the backhaul signals to the RS in the subframe 3 using the DL frequency band and, at the same time, transmit the access signal to the MaUE using the DL frequency band. Here, the backhaul signal transmitted to the RS and the access signal transmitted to the MaUE are orthogonal to each other.

When the RS transmits the backhaul signals to the BS in the subframe 8 using the DL frequency band, the BS is not allowed to transmit the access signal to the MaUE using the DL frequency band. Accordingly, the BS can configure a DL frequency band for the MaUE in the subframe 8 in MBSFN subframes. The RS may transmit the backhaul signals to the BS in the subframe 8 using the DL frequency band and, at the same time, transmit the access signal to the ReUE using the DL frequency band. Here, the backhaul signal transmitted to the BS and the access signal transmitted to the ReUE are orthogonal to each other.

When transmitting the backhaul signals to the RS in the subframe 3 of the UL frequency band, the BS cannot listen to the access signal transmitted by the MaUE. Accordingly, uplink radio resources may not be assigned to the MaUE in the subframe 3. When the BS transmits the backhaul signals to the RS in the subframe 3 using the UL frequency band, the ReUE can transmit the access signal to the RS using the UL frequency band. Here, the backhaul signal transmitted by the BS and the access signal transmitted by the ReUE are orthogonal to each other.

When transmitting the backhaul signals to the BS in the subframe 8 of the UL frequency band, the RS cannot listen to the access signal transmitted by the ReUE. Accordingly, in the subframe 8, uplink radio resources may not be assigned to the ReUE. When the RS transmits the backhaul signals to the BS in the subframe 8 using the UL frequency band, the MaUE can transmit the access signal to the BS using the UL frequency band. Here, the backhaul signal transmitted by the RS and the access signal transmitted by the MaUE are orthogonal to each other.

Unlike the case in which the BS or the RS transmits the backhaul signal using both the DL frequency band and the UL frequency band in the same subframe as shown in FIG. 9, the BS or the RS may transmit the backhaul signal in different subframes. In FIG. 10, the BS transmits backhaul signals to the RS in the subframe 3 of the DL frequency band and in the subframe 2 of the UL frequency band, and the RS transmits backhaul signals to the BS in the subframe 8 of the DL frequency band and in the subframe 7 of the UL frequency band.

For example, when the BS transmits backhaul signals to the RS using both the DL frequency band and the UL frequency band in the same subframe, the RS can receive a large amount of data from the BS within a short period of time. Accordingly, some of the data may not be processed and so lost. To prevent this problem, the BS or the RS can transmit the backhaul signals using both the DL frequency band and the UL frequency band in different subframes.

FIG. 11 is a flowchart illustrating a method of transmitting backhaul signals according to an embodiment of the present invention.

Referring to FIG. 11, the BS and the RS exchanges a configuration signal for the transmission of backhaul signals at step S100. The configuration signal can include information about a domain assigned to transmit the backhaul signals. The configuration signal can include information about, for example, frequency bands through which the backhaul signal is transmitted, the position, the number, etc. of subframes which are assigned to transmit the backhaul signals within each frequency band, and so on. In the case in which the backhaul signals are periodically transmitted, the configuration signal may include information about the cycle of subframes within each frequency band through which the backhaul signals are transmitted.

The information included in the configuration signal can be configured semi-persistently or dynamically. For example, if the domain assigned to transmit the backhaul signal is semi-persistently configured, the BS or the RS can transmit the backhaul signal in subframes which have been semi-persistently configured within a predetermined period of time or until a new configuration signal is exchanged. If the domain assigned to transmit the backhaul signal is dynamically configured, the BS or the RS can exchange the configuration signal whenever the backhaul signal is transmitted.

A domain assigned to transmit the backhaul signals in one of the frequency bands, of the information included in the configuration signal, may be semi-persistently configured, and a domain assigned to transmit the backhaul signals in the other frequency band, of the information, may be dynamically configured. Here, a configuration signal including the dynamically configured information can be transmitted using the semi-persistently configured domain.

The configuration signal can be expressed using a bitmap. For example, if the configuration signal is expressed by "0010 0000 00", it can mean that the backhaul signals are transmitted in the third subframe.

The configuration signal can be exchanged when the RS initially enters a network or enters a network again or when the RS performs scheduling for the transmission of backhaul signals again.

The BS or the RS transmits the backhaul signals using both the DL frequency band and the UL frequency band based on the information included in the configuration signal at step S110.

As described above, the BS or the RS can transmit the backhaul signals using both the DL frequency band and the UL frequency band. However, the BS or the RS may transmit the backhaul signals selectively using either the DL frequency band or the UL frequency band according to communication conditions.

Figure 12:
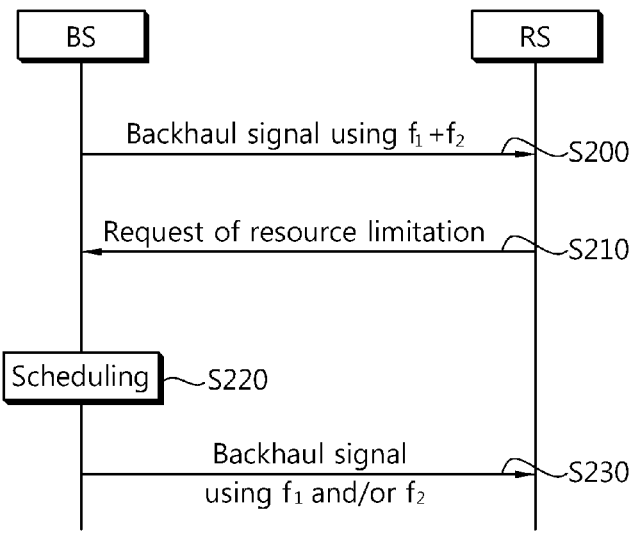
FIG. 12 is a flowchart illustrating a method of transmitting backhaul signals according to another embodiment of the present invention.

FIG. 12 is a flowchart illustrating a method of transmitting backhaul signals according to another embodiment of the present invention. The method of the present invention illustrates an example in which a BS transmits the backhaul signals to an RS, for convenience of description, but is not limited to the above example. For example, the method can be applied to an example in which the RS transmits backhaul signals to the BS.

Referring to FIG. 12, the BS transmits the backhaul signals to the RS using both the DL frequency band f1 and the UL frequency band f2 at step S200.

The RS transmits a request to limit frequency bands or subframes or both for the transmission of the backhaul signals to the BS according to communication conditions at step S210. The communication conditions can be determined with consideration taken of the amount of traffic, Quality of Service (QoS) requirements, channel state information, and a buffer state. The channel state information can be determined with consideration taken of a Signal to Interference and Noise Ratio (SINR), a Signal to Noise Ratio (SNR), and a Channel Quality Indicator (CQI). For example, if a BS transmits backhaul signals to an RS using a DL frequency band in a specific subframe, the RS is not allowed to transmit signals to an ReUE using the DL frequency band in the specific subframe. In the case in which the RS has a large amount of downlink traffic to be transmitted to the ReUE, resources for downlink transmission can be insufficient. Accordingly, the RS can request the BS to transmit the backhaul signals only through an UL frequency band.

In addition, the RS can request an adequate number or location of subframes for each frequency band from the BS. The RS may also request a change in the number of subframes for each frequency band, which is now being used to transmit the backhaul signals, from the BS.

The BS performs scheduling based on the request to limit the frequency bands, which has been received from the RS, at step S220 and transmits the backhaul signals to the RS using the scheduled resources at step S230. The BS can transmit the backhaul signals to the RS using the DL frequency band f1 or the UL frequency band f2 or both.

FIG. 12 illustrates an example in which one RS transmits and receives the backhaul signals to and from the BS. However, the method of FIG. 12 can also be applied to an example in which a plurality of RSs transmits and receives backhaul signals to and from a BS.

Figure 13:
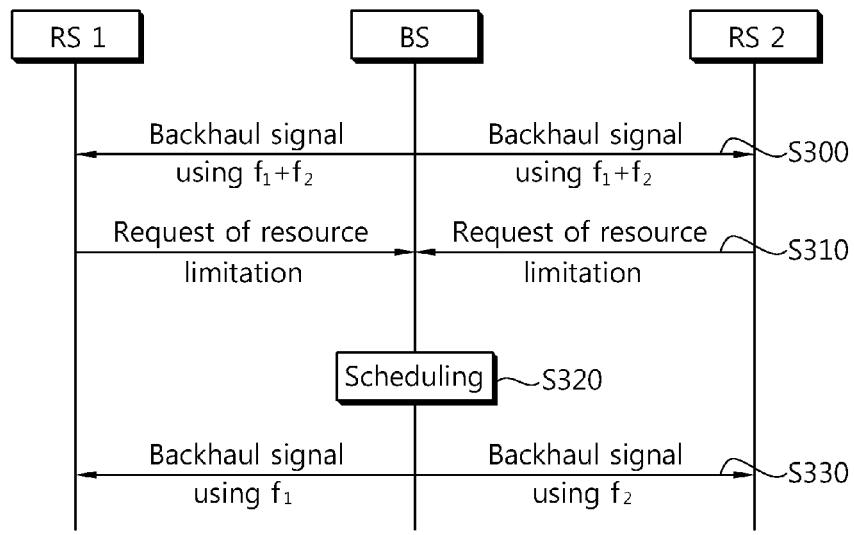
FIG. 13 is a flowchart illustrating a method of transmitting backhaul signals according to another embodiment of the present invention.

FIG. 13 is a flowchart illustrating a method of transmitting backhaul signals according to another embodiment of the present invention. The method of the present invention illustrates an example in which a BS transmits the backhaul signals to RSs, for convenience of description, but is not limited to the above example. For example, the method can be applied to an example in which the RSs transmit backhaul signals to the BS.

Referring to FIG. 13, the BS transmits the backhaul signals to a Relay Station 1 (RS 1) and a Relay Station 2 (RS 2) using both the DL frequency band f1 and the UL frequency band f2 at step S300.

The RS 1 and the RS 2 transmit respective requests to limit frequency bands or subframes or both for the transmission of the backhaul signals to the BS at step S310. Here, it is assumed that the RS 1 is limited to receive the backhaul signals through the DL frequency band f1, and the RS 2 is limited to receive the backhaul signals through the UL frequency band f2.

The BS performs scheduling based on the requests received from the respective RS 1 and RS 2 at step S320 and transmits the backhaul signals to the RS 1 and the RS 2 using the scheduled resources at step S330. In this case, the BS can perform the scheduling such that the backhaul signals can be transmitted to the RS 1 and the RS 2 using the DL frequency band f1 and the UL frequency band f2, respectively. That is, the BS can transmit the backhaul signals to the RS 1 using the DL frequency band f1 and transmit the backhaul signals to the RS 2 using the UL frequency band f2. Even in the case in which the RS can receive the backhaul signals through one of the DL frequency band and the UL frequency band, the BS can transmit the backhaul signals using both the UL frequency band and the DL frequency band. Accordingly, radio resources can be efficiently used.

Next, a TDD system is taken into consideration. In TDD, downlink transmission and uplink transmission are separated from each other in the time dimension. Hereinafter, a subframe for downlink transmission is referred to as DL subframes, and a subframe for uplink transmission is referred to as UL subframes.

Figure 14:
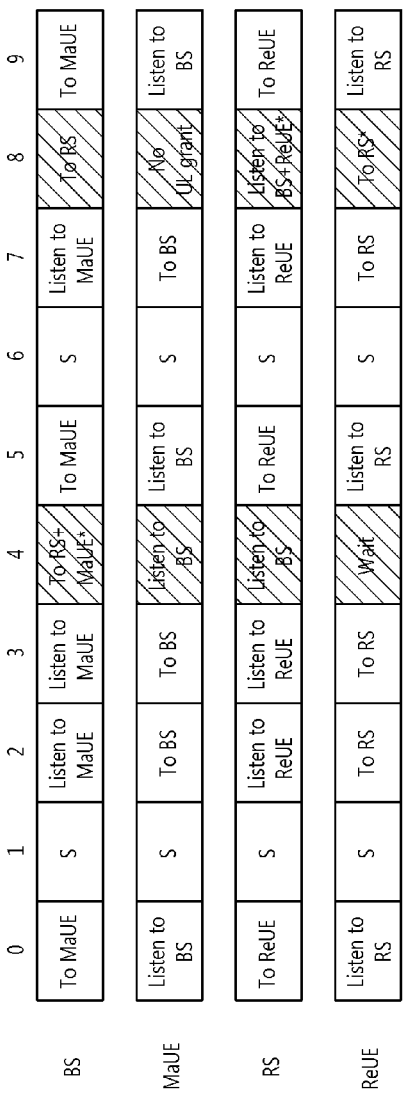
FIG. 14 illustrates an example in which a BS transmits backhaul signals to an RS in the TDD mode according to an embodiment of the present invention.

FIG. 14 illustrates an example in which a BS transmits backhaul signals to an RS in the TDD mode according to an embodiment of the present invention. The radio frame structure presented in the configuration 1 of Table 1 is described as an example.

Referring to FIG. 14, the BS transmits an access signal to an MaUE in DL subframes, and the RS transmits an access signal to an ReUE in the DL subframe. Accordingly, the mobile stations can consistently monitor a reference signal, a control channel, and a synchronization signal. The MaUE transmits an access signal to the BS in UL subframes, and the ReUE transmits an access signal to the RS in the UL subframe. Here, "*" or "**" means that orthogonality must be guaranteed between two different signals which are transmitted and received at the same time.

The BS can transmit backhaul signals to the RS using both the DL subframes and the UL subframes. The BS transmits the backhaul signals to the RS in a subframe 4 (i.e., the DL subframe) and in a subframe 8 (i.e., the UL subframe). The BS can transmit some of the backhaul signals in the subframe 4 and transmit the remainder of the backhaul signals in the subframe 8.

The BS can transmit different codewords in the DL subframes and the UL subframes or transmit the same codeword in the DL subframes and the UL subframes. If different codewords which have experienced additional channel coding processes are transmitted in the respective DL and UL subframes, the transmission rate can be enhanced because a large amount of backhaul signals can be transmitted. If one codeword that has experienced one channel coding process is transmitted through each of the DL and UL subframes, the convenience of an ACK/NACK process or the frequency diversity gain effect can be maximized.

It is difficult for the RS to transmit and receive signals in the same frequency band at the same time. When the BS transmits the backhaul signals to the RS in the subframe 4, the RS is not allowed to transmit the access signal to the ReUE. Accordingly, the RS can configure the subframe 4 for the ReUE in MBSFN subframes. The BS may transmit the access signal to the MaUE at the same time when transmitting the backhaul signals to the RS in the subframe 4. At this time, the backhaul signal transmitted to the RS and the access signal transmitted to the MaUE are orthogonal to each other.

When the BS transmits the backhaul signals to the RS in the subframe 8, the BS cannot listen to the access signal transmitted by the MaUE. Accordingly, in the subframe 8, uplink radio resources may not be assigned to the MaUE. The ReUE can transmit the access signal to the RS at the same time when the BS transmits the backhaul signals to the RS in the subframe 8. At this time, the backhaul signal transmitted by the BS and the access signal transmitted by the ReUE are orthogonal to each other.

Figure 15:
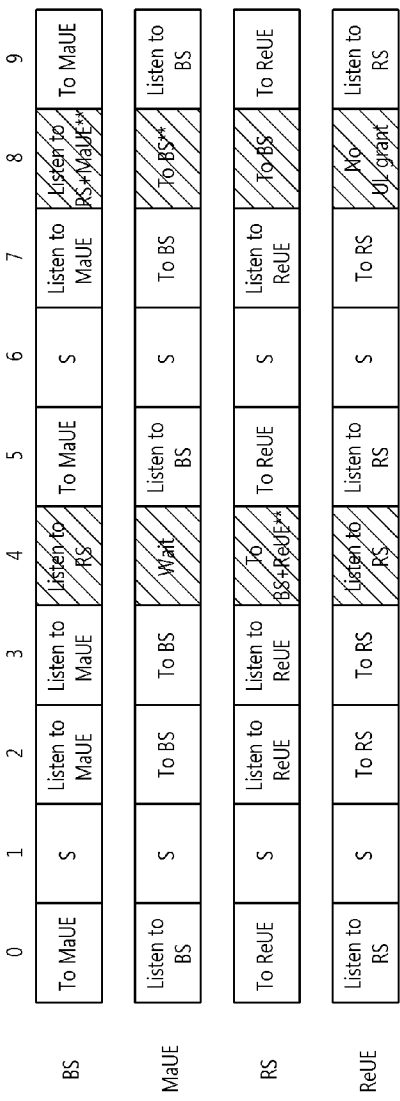
FIG. 15 illustrates an example in which an RS transmits backhaul signals to a BS in the TDD mode according to an embodiment of the present invention.

FIG. 15 illustrates an example in which an RS transmits backhaul signals to a BS in the TDD mode according to an embodiment of the present invention. The radio frame structure presented in the configuration 1 of Table 1 is described as an example.

Referring to FIG. 15, the BS transmits an access signal to an MaUE in DL subframes, and the RS transmits an access signal to an ReUE in DL subframes. Accordingly, the mobile stations can consistently monitor a reference signal, a control channel, and a synchronization signal. The MaUE transmits an access signal to the BS in UL subframes, and the ReUE transmits an access signal to the RS in UL subframes. Here, "*" or "**" means that orthogonality must be guaranteed between two different signals which are transmitted and received at the same time.

The RS can transmit backhaul signals to the BS using both the DL subframes and the UL subframes. The RS transmits the backhaul signals to the BS in a subframe 4 (i.e., the DL subframe) and a subframe 8 (i.e., the UL subframe). The RS can transmit some of the backhaul signals in the subframe 4 and transmit the remainder of the backhaul signals in the subframe 8.

The RS can transmit different codewords in the DL subframes and the UL subframe or transmit the same codeword in the DL subframes and the UL subframes. If different codewords which have experienced additional channel coding processes are transmitted in the respective DL and UL subframes, the transmission rate can be enhanced because a large amount of backhaul signals can be transmitted. If one codeword that has experienced one channel coding process is transmitted through each of the DL and UL subframes, the convenience of an ACK/NACK process or the frequency diversity gain effect can be maximized.

It is difficult for the BS to transmit and receive the signals in the same frequency band at the same time. When the RS transmits the backhaul signals to the BS in the subframe 4, the BS is not allowed to transmit the access signal to the MaUE. Accordingly, the BS can configure the subframe 4 for the MaUE in MBSFN subframes. The RS may transmit the access signal to the ReUE at the same time when transmitting the backhaul signals to the BS in the subframe 4. At this time, the backhaul signal transmitted to the BS and the access signal transmitted to the ReUE are orthogonal to each other.

When the RS transmits the backhaul signals to the BS in the subframe 8, the RS cannot listen to the access signal transmitted by the ReUE. Accordingly, in the subframe 8, uplink radio resources may not be assigned to the ReUE. The MaUE can transmit the access signal to the BS at the same time when the RS transmits the backhaul signals to the BS in the subframe 8. At this time, the backhaul signal transmitted by the RS and the access signal transmitted by the MaUE are orthogonal to each other.

FIGS. 14 and 15 show the examples in which a BS and an RS have the same TDD radio frame structure, but the present invention is not limited to the above examples. For example, the BS and the RS may have different TDD radio frame structures.

In the same manner as the FDD system, even in the TDD system, the BS and the RS can exchange a configuration signal for the transmission of backhaul signals. The configuration signal can include information about a domain assigned to transmit the backhaul signals. The configuration signal can include information about, for example, the position, the number, etc. of subframes which are assigned to transmit the backhaul signals.

The information included in the configuration signal can be configured semi-persistently or dynamically. For example, if subframes assigned to transmit the backhaul signals are semi-persistently configured, the BS or the RS can transmit the backhaul signals in the subframes which have been semi-persistently configured within a predetermined period of time or until a new configuration signal is exchanged. If subframes assigned to transmit the backhaul signals are dynamically configured, the BS or the RS can exchange a configuration signal whenever the backhaul signal is transmitted. A configuration signal for transmitting backhaul signals in one of DL subframes and UL subframes can be semi-persistently configured, and a configuration signal for transmitting backhaul signals in the other of the DL subframes and the UL subframes can be dynamically configured. The configuration signal dynamically configured can be transmitted in the subframes semi-persistently configured.

Figure 16:
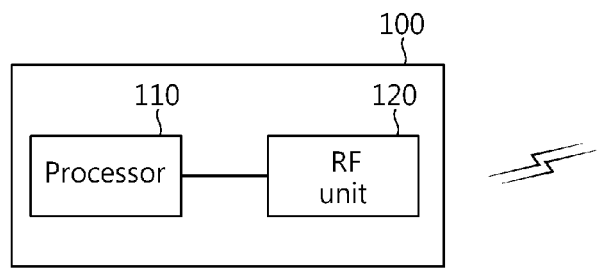
FIG. 16 is a block diagram of a BS or an RS according to an embodiment of the present invention.

FIG. 16 is a block diagram of a BS or an RS according to an embodiment of the present invention.

Referring to FIG. 16, the BS or the RS 100 includes a processor 110 and a Radio Frequency (RF) unit 120. The RF unit 120 transmits and receives a radio signal. The processor 110 is coupled to the RF unit 120. The processor 110 is configured to perform scheduling for the transmission of backhaul signals and to transmit the backhaul signal to the RS or the BS using both resources for downlink transmission and resources for uplink transmission based on the scheduling.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method of transmitting backhaul signals performed by a relay station in a wireless communication system, the method comprising:
    receiving, from a base station, scheduling information about resources assigned to transmit backhaul signals; and
    transmitting the backhaul signals to the base station using both resources for downlink transmission and resources for uplink transmission simultaneously based on the scheduling information.

2. The method of claim 1, wherein the resources for downlink transmission comprise a first frequency band, and the resources for uplink transmission comprise a second frequency band.

3. The method of claim 2, wherein the backhaul signals are simultaneously transmitted in the first frequency band and the second frequency band.

4. The method of claim 2, wherein the backhaul signals respectively transmitted in the first frequency band and the second frequency band are subjected to a single channel coding process thereby resulting in one codeword.

5. The method of claim 1, wherein the scheduling information about the resources assigned to transmit the backhaul signals is semi-persistently indicated using a bitmap.

6. The method of claim 1, wherein some of the scheduling information about the resources assigned to transmit the backhaul signals is semi-persistently indicated, and a remainder of the scheduling information about the resources assigned to transmit the backhaul signals is dynamically indicated.

7. The method of claim 6, wherein the scheduling information about the dynamically indicated resources is transmitted using the semi-persistently indicated resources.

8. The method of claim 1, wherein the resources for downlink transmission comprise a first time domain, and the resources for uplink transmission comprise a second time domain.

9. A method of transmitting backhaul signals performed by a base station in a wireless communication system, the method comprising:
    performing scheduling in order to transmit the backhaul signals; and
    transmitting the backhaul signals to at least one relay station using both resources for downlink transmission and resources for uplink transmission simultaneously based on the scheduling.

10. The method of claim 9, wherein the resources for downlink transmission comprise a first frequency band, the resources for uplink transmission comprise a second frequency band, and the backhaul signals are simultaneously transmitted in the first frequency band and the second frequency band.

11. The method of claim 9, wherein performing the scheduling comprises exchanging scheduling information about resources assigned to transmit the backhaul signals with the relay station.

12. The method of claim 10, wherein the base station transmits a first backhaul signal to a first relay station in the first frequency band and transmits a second backhaul signal to a second relay station in the second frequency band.

13. The method of claim 9, further comprising receiving a request to limit resources from the at least one relay station based on communication conditions, wherein the request is used to limit frequency bands or subframes assigned in order to transmit the backhaul signals.

14. A relay station in a wireless communication system, the relay station comprising:
    a Radio Frequency (RF) unit configured to transmit and receive a radio signal; and
    a processor coupled to the RF unit and configured to receive from a base station, scheduling information about resources assigned to transmit backhaul signals and to transmit the backhaul signals to the base station using both resources for downlink transmission and resources for uplink transmission simultaneously based on the scheduling information.

15. A base station in a wireless communication system, the base station comprising:
    a Radio Frequency (RF) unit configured to transmit and receive a radio signal; and
    a processor coupled to the RF unit and configured to perform scheduling in order to transmit backhaul signals and to transmit the backhaul signals to at least one relay station using both resources for downlink transmission and resources for uplink transmission simultaneously based on the scheduling.

* * * * *